United States Patent [19]
Christner et al.

[11] Patent Number: 4,727,642
[45] Date of Patent: Mar. 1, 1988

[54] TOOL-CHANGER MECHANISM

[75] Inventors: Walter Christner, Hülben; Peter Häussler, Pfullingen, both of Fed. Rep. of Germany

[73] Assignee: Burkhardt & Weber GmbH & Co KG, Reutlingen, Fed. Rep. of Germany

[21] Appl. No.: 864,838

[22] Filed: May 20, 1986

[30] Foreign Application Priority Data
Jun. 21, 1985 [DE] Fed. Rep. of Germany ....... 3522156
Oct. 9, 1985 [DE] Fed. Rep. of Germany ....... 3536048

[51] Int. Cl.⁴ .................................................. B23Q 3/157
[52] U.S. Cl. .......................................... 29/568; 74/30
[58] Field of Search .................. 29/568; 74/29, 30, 33

[56] References Cited

U.S. PATENT DOCUMENTS

| | | | |
|---|---|---|---|
| 1,099,874 | 6/1914 | Dorward | 74/30 |
| 1,440,035 | 12/1922 | Struble | 74/30 |
| 1,534,789 | 4/1925 | Judelson | 74/30 |
| 3,218,706 | 11/1965 | Zankl et al. | 29/568 |

FOREIGN PATENT DOCUMENTS

| | | | |
|---|---|---|---|
| 211443 | 12/1982 | Japan | 29/568 |
| 45837 | 3/1983 | Japan | 29/568 |
| 255746 | 10/1970 | U.S.S.R. | 29/568 |
| 755496 | 8/1980 | U.S.S.R. | 29/568 |

Primary Examiner—Gil Weidenfeld
Assistant Examiner—Daniel W. Howell
Attorney, Agent, or Firm—Hopgood, Calimafde, Kalil, Blaustein & Judlowe

[57] ABSTRACT

A cylindrical support for a tool changer arm is provided with U-shaped gear toothed means, such that rotation of a pinion which engages the gear toothed means causes an axial movement of the tool changer, a 180° rotation of the tool changer, and an opposite axial movement of the tool changer.

12 Claims, 8 Drawing Figures

TOOL-CHANGER MECHANISM

BACKGROUND OF THE INVENTION

The present invention relates to a tool-changer mechanism for a machine tool, particularly for a combination milling, drilling and boring machine, wherein a mounting plate or slide carries tool-gripping means for engaging, extracting and replacing tools and (1) can be displaced axially from a rear (or retracted) position into a forward (projecting) position, (2) is rotatable about its axis while in the forward position, and (3) in the rotated position can be withdrawn axially to its retracted position where a replacement tool will have been inserted into the spindle of the machine tool.

Tool changers of this kind serve for simultaneously (1) removing the tool to be replaced from the machine spindle, (2) removing a selected replacement tool from a tools magazine, and (3) rotationally displacing the replacement tool prior to its axial insertion into the spindle. The most demanding requirement is for speed in effecting the tool replacement.

Prior constructions for the indicated purposes have involved one drive mechanism for the requisite axial displacement, an additional drive mechanism for the rotary displacement, and suitable means for coordinating the action of these separate drives. U.S. Pat. No. 3,218,706 and published German specifications, laid open application DT No. 1,301,700 and DE No. 2,325,563, illustratively describe such systems. But they are all encumbered by mechanical complexity, inertially limited response times, and problems of drive coordination.

BRIEF STATEMENT OF THE INVENTION

It is an object of the invention to provide an improved tool-changing drive mechanism avoiding time-limiting and other problems of prior mechanisms.

A specific object is to meet the above object with mechanism that represents substantial simplification and which will effect the requisite cycle of axial and rotary displacement of a tool-changer slide, using but a single drive mechanism which is continuously operative throughout its drive cycle.

The tool-changer mechanism of the invention is characterized by the fact that a single pinion drive has meshed engagement with a U-shaped rack forming part of the tool-changing slide, and the course of the rack follows and dictates a complex course of slide movement, namely, axially forward, followed by partial rotation, and concluding with axial retraction. The surprising result is achieved that only a single and continuously running drive, namely rotary drive for the pinion, is required for the entire tool-changing process. This has the advantage over known tool changers, in which separate drives are provided for the rotary and axial components of displacement, wherein the separate drives must be individually controlled and coordinated by a machining unit control system; since there is but a single drive, there is no need for multiple drives or for their coordination, so that tool-changing time and complexity are materially reduced. The invention also eliminates an otherwise high degree of susceptibility to possible disturbances, both with respect to separate drives and with respect to the control needed for coordination of separate drives. Other advantages of the invention flow from use of fewer parts which are subject to wear, and from the fact that the control system of the machine tool need merely monitor and control this single drive. With the invention, no time-consuming switching requirement is imposed upon the control system, because rotary displacement derives from axial movement of the tool-changer slide. This structural feature importantly contributes to a shortening of tool-change time and to reduction of the probability of possibly incorrect switchings; indeed, with the invention, it is only necessary to switch on the drive at the beginning of a tool-changing procedural cycle, and to switch off the drive at the end of the cycle.

In order for the gripper device and its mounting slide to assume a position which is precisely defined with respect to the tools to be replaced (when the base body is in its retracted position), it is advantageous to provide an axial stop for the slide. However, use of such a stop imposes the requirement that the pinion drive must be controlled very precisely, thereby assuring that the drive stops precisely at the moment when the slide has reached the stop.

In an advantageous further development of the invention means are provided to prevent the slide from rotating when in retracted position, while a second U-shaped rack is provided for pinion engagement when the slide is in its retracted position. This second U-shaped rack characterizes the outer surface of an annular ring which is axially referenced to the slide while being rotatable with respect to the slide. Specifically, each of the two U-shaped racks is characterized by two longitudinal arms (courses), with elbow-bend connections to the respective ends of an arcuate web; the free ends of both U-shaped racks register for pinion transfer from engagement with one to the other of the racks. The configuration results in assuring that in the retracted position of the slide (and, hence, of the tool-engaging gripper system), the drive pinion engages only the rack of the ring that is rotatable with respect to the slide; and use is made of a partial rotation of the ring, in the retracted position of the slide and ring, whereby such partial rotation actuates gripper elements from closed to open condition and also whereby a non-critical time is available in which to terminate pinion drive after the retracted position has been achieved.

More specifically, it is advantageous to provide the ring with an actuating connection to clamp mechanism of the gripper devices, and to provide a detent in the actuating connection between the ring and the clamp mechanism, thereby further reducing any criticality in terminating the pinion drive as long as the pinion is engaged to the rack web of the ring.

In accordance with another favorable embodiment, a non-uniform drive is provided for the pinion, the arrangement being such that the purely axial and the purely rotary displacements of the slide are rapid and so that the speed of pinion action on the rack is relatively slow during pinion engagement with the transitional bend between axial and rotary phases of the slide-displacement cycle. This is of particular importance when heavy tools are to be replaced because a heavily laden tool changer would be exposed to relatively great inertial stress when the direction of slide displacement changes. The drive for producing the non-uniform speed of rotation can be developed as a motor having suitable variable-speed control, or as a motor having a suitable varying-speed transmission, e.g., an oval or elliptical gear transmission.

In another favorable embodiment, the slide is provided with a sensor system by means of which the load of tools on the slide can be measured; and a control system responsive to sensor-system measurement may, upon a change involving heavy tools, adapt the drive of the pinion to the weight of the tools being replaced. In this way, a tool-change speed which is adapted to the weight of the tool is obtained in simple fashion. Damage to the drive, to the slide and its rack, and to the supporting means for the slide is thereby also avoided.

DETAILED DESCRIPTION

The invention will be described in detail for each of two tool-changer embodiments of the invention, in conjunction with the accompanying drawing, in which.

Figure 1:
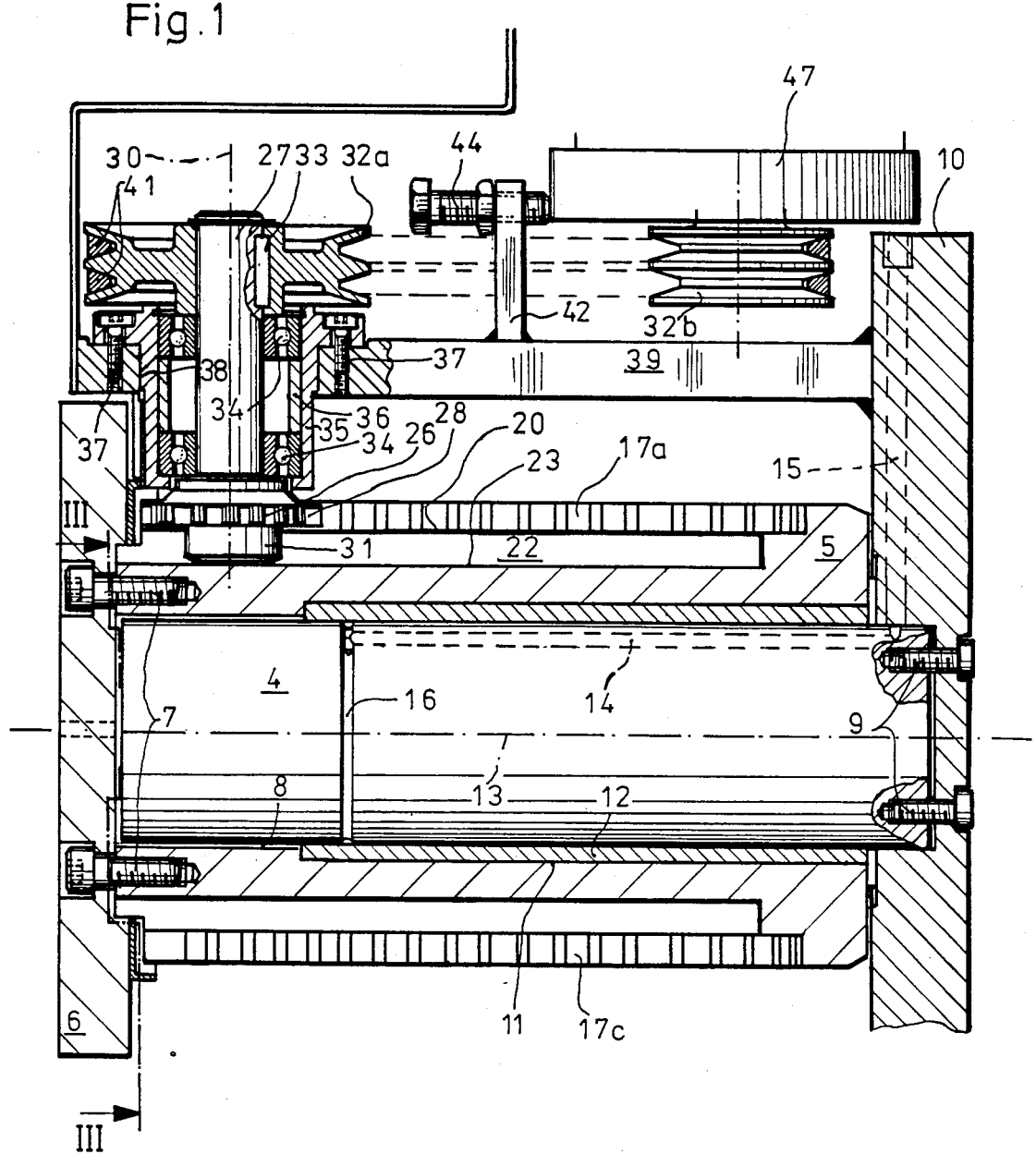
FIG. 1 is a vertical section, through tool-changer mechanism of the first embodiment, the section plane being defined by an axis 13 of axial and rotary motion and by an axis 30 of drive-pinion rotation to impart such axial and rotary motion, involved parts being shown for a retracted condition of the mechanism.
Figure 2:
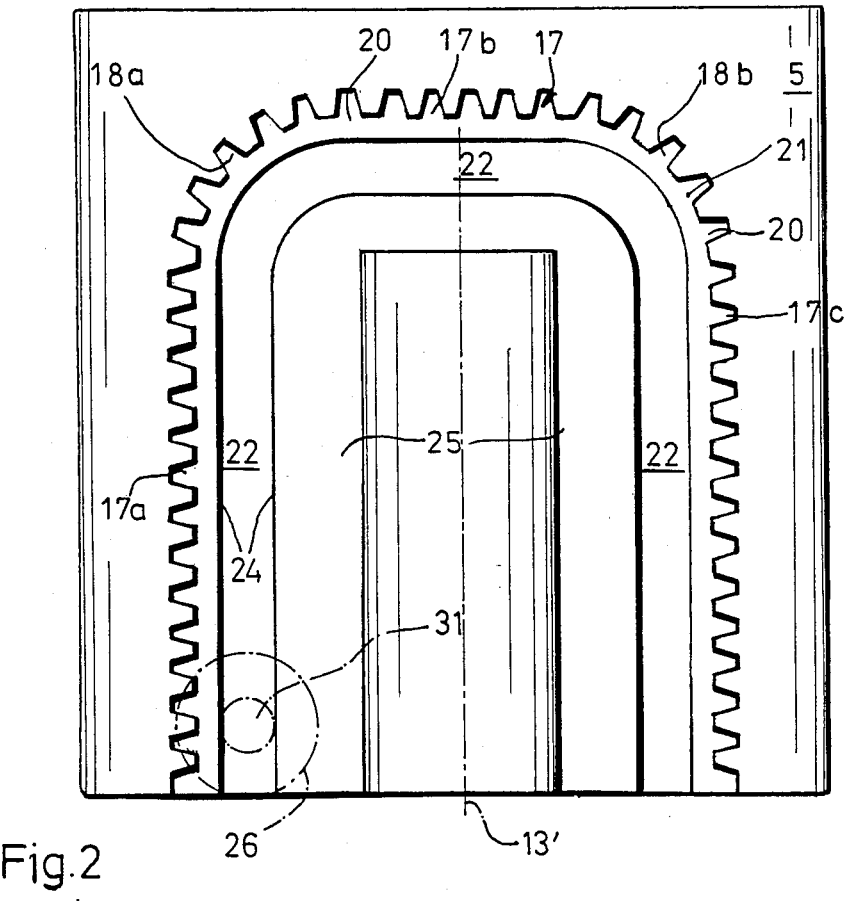
FIG. 2 is a flattened plan-view development of pinion-driven structure of FIG. 1, wherein an axis 13', parallel to the axis 13 of FIG. 1, is indicated as the axis of symmetry of the development.
Figure 3:
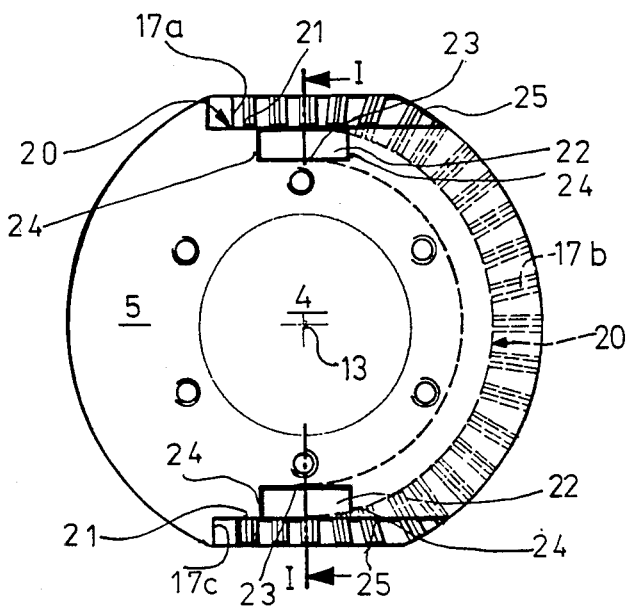
FIG. 3 is a front-end view, taken at III—III of FIG. 1 and on a reduced scale, to show the arcuate nature of pinion-driven structure of FIG. 1, the section of the plane of FIG. 1 being indicated at I—I.
Figure 4:
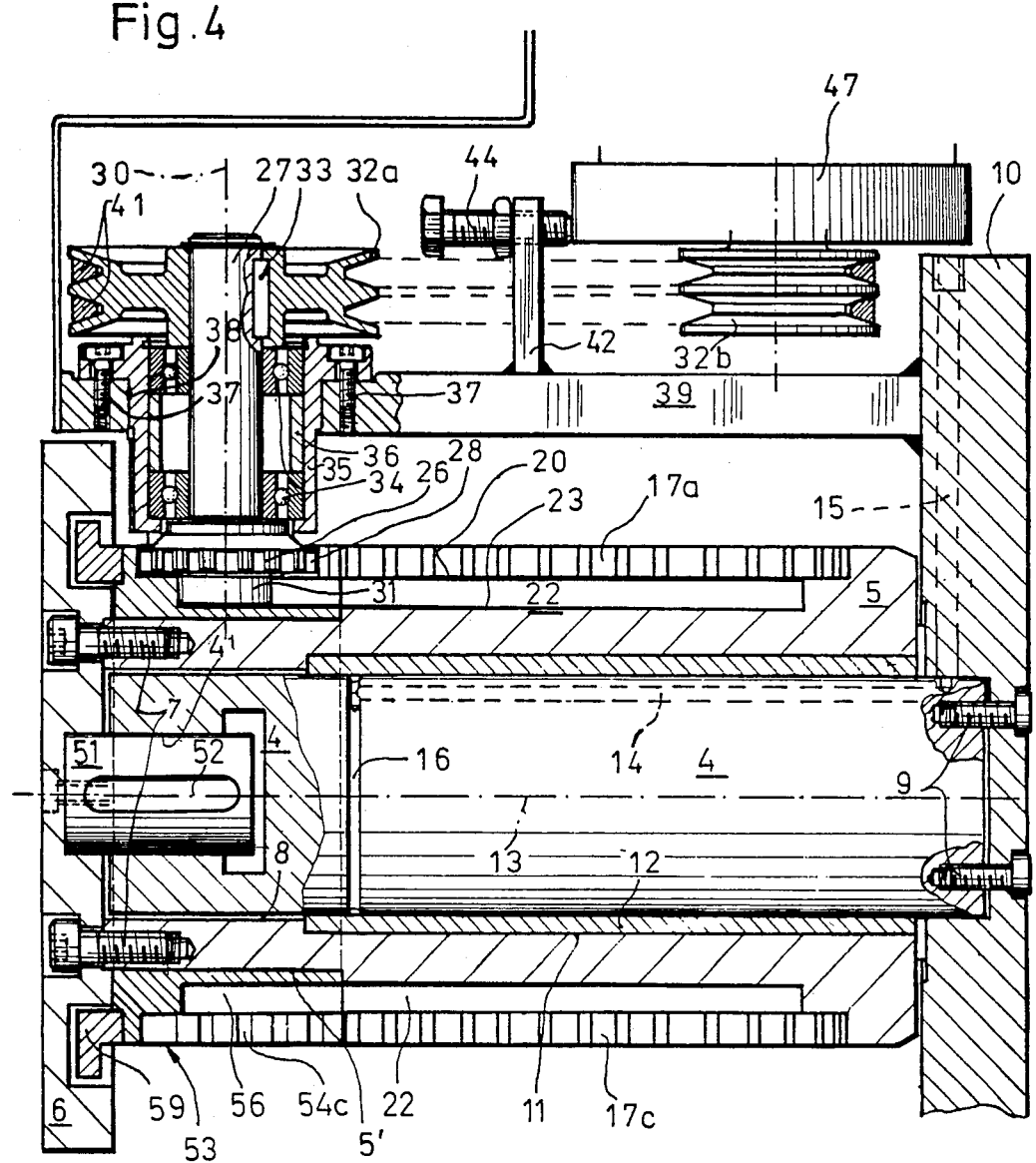
Figure 5:
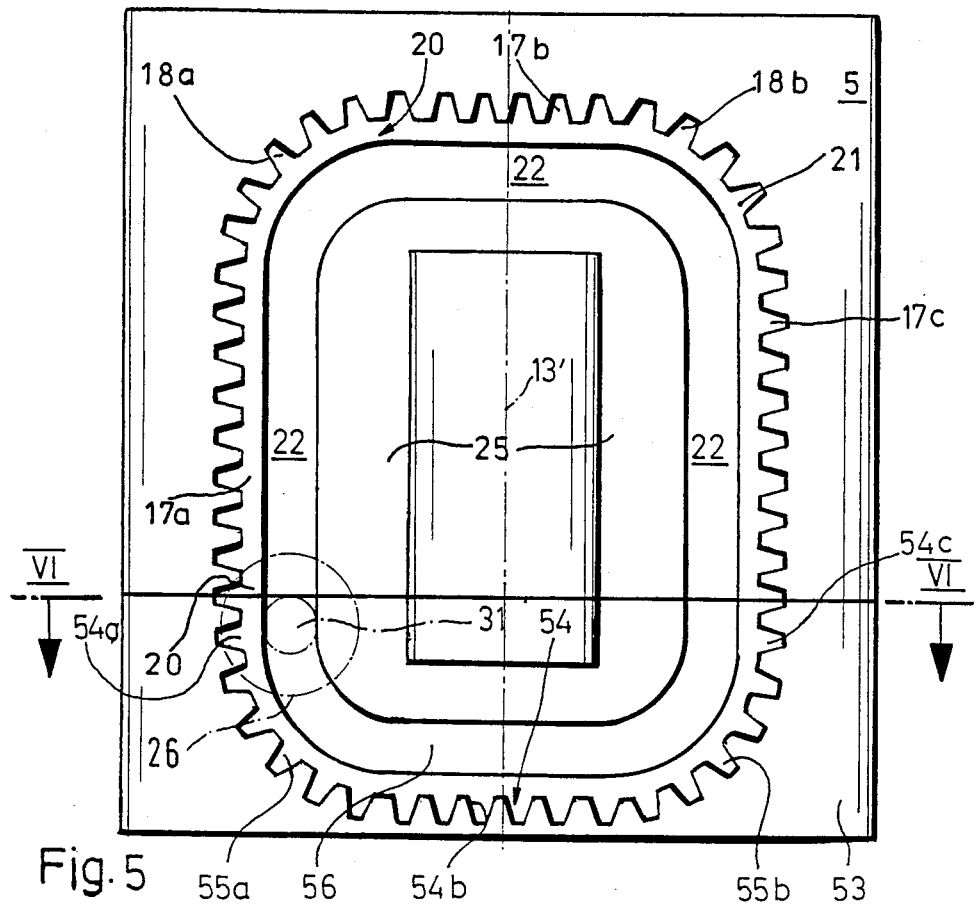
Figure 6:
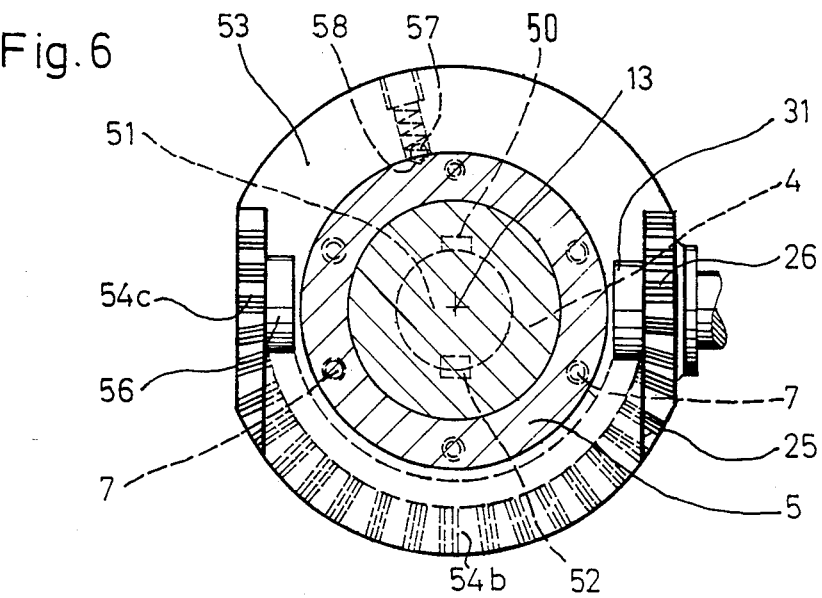
Figure 7:
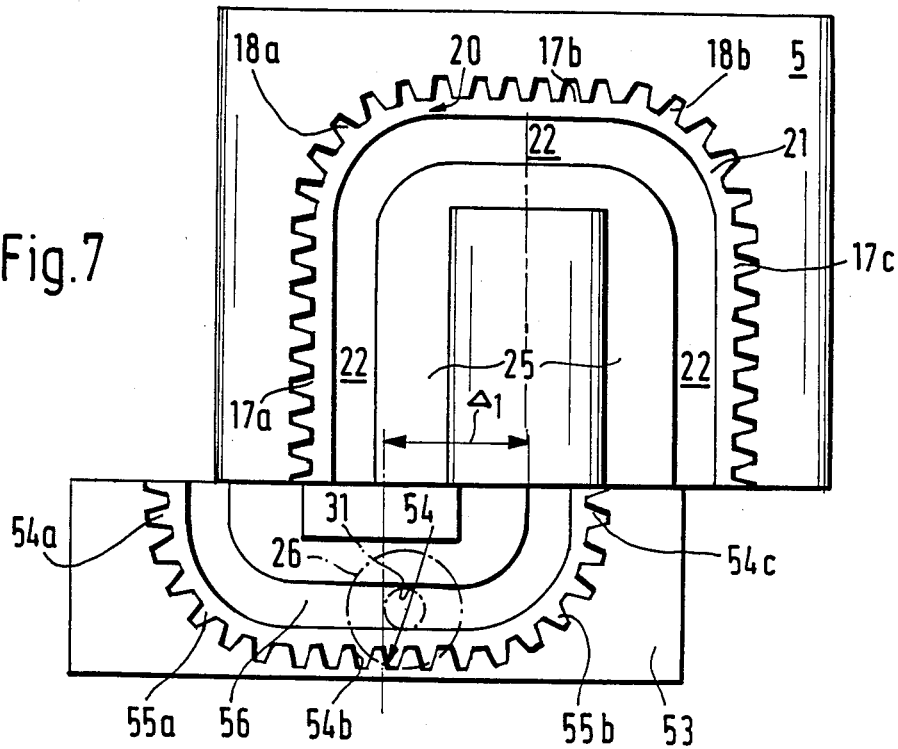
Figure 8:
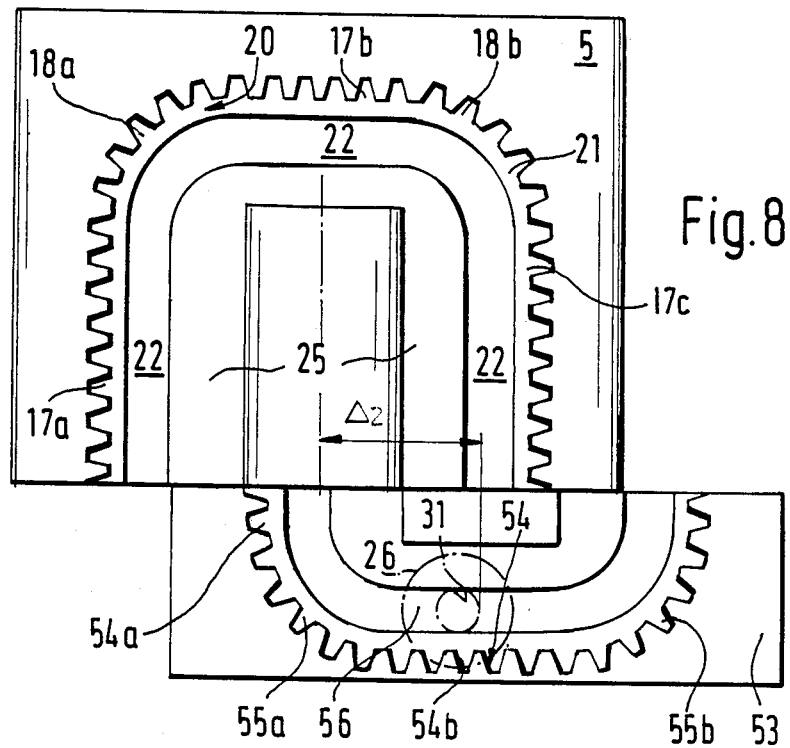

FIGS. 4, 5 and 6 are views respectively corresponding to FIGS. 1, 2 and 3, but showing the second embodiment, and FIG. 6 being a section at VI—VI of FIG. 5; and FIGS. 7 and 8 are views similar to FIG. 5, to show parts relationships for each of two conditions of operation.

The tool-changer mechanism of FIG. 1 is conventionally mounted to the fixed stand or other frame structure 10 of a machine tool (not otherwise shown). A fixed cylindrical bearing member 4 is secured to stand 10 by four bolts 9 to establish a cantilevered fixed axis 13 of bearing reference for an elongate annular slide 5, to the forward end of which a tool-changer mounting plate 6 is secured by bolts 7. The longitudinal axis 13 of tool-changer mounting to bearing member 4 will be understood to be parallel to and offset from the spindle axis of the machine tool, and to be at equal and opposite parallel offset from the axis of tool retrieval or reception in a suitable tool-storage magazine (not shown); in this situation, the particular tool-engagement configuration (not shown) mounted to plate 6 will be understood to comprise two like tool-chucking or gripper devices at 180° opposed locations, for rotary manipulation into concurrent registration (a) with the spindle axis and (b) with the retrieval/reception axis of the magazine. Detail of the two chucking devices and their 180° symmetry of locations about axis 13 is not a part of the invention; it suffices to note that actuating mechanism to be described proceeds through a cycle of axially forward displacement of bearing member 4 (and plate 6) from the retracted position of FIG. 1, followed by a 180° rotation to reverse the positions of tool-chucking devices on plate 6, and then full axial retraction of bearing member 4 and plate 6, to a stop position at the adjacent front face of frame member 10. It also suffices to note that actuating means (not shown) for the respective chucks or grippers on plate 6 may be via bearing member 4.

More specifically, the inner contour of slide 5 is characterized by a short forward-end cylindrical bore 8 having radial clearance with bearing member 4, and a journal-bearing bushing 12 press-fitted to a cylindrical counterbore 11 extends rearward to lap the remaining approximately three-quarters of the length of bearing member 4. The lapped bearing interface is lubricated via lubricant feed lines 14/15 in members 4/10 to an annular lubricating groove 16 in the outer surface of bearing member 4. Groove 16 is positioned at such distance from the adjacent stop surface of frame 10 that bushing 12 is served with lubricant at all times during axial and/or rotary displacement of slide 5.

As perhaps better shown in the flattened diagram of FIG. 2, the exterior of slide 5 is characterized by a U-shaped rack 17, wherein a first arm 17a extends longitudinally (parallel to the axis 13 of axial and/or rotary displacement) from a forward location of proximity to plate 6, and rearwardly to a first rear bend or elbow 18a (of 90° extent). The rear bend 18a tangentially communicates with an arcuate web portion 17b of the rack, wherein web portion 17b extends over a 180° arc about the central axis 13 and in a rear plane that is normal to axis 13. From web portion 17b, the rack 17 continues via a second 90° bend 18b and into tangential communication with a second arm 17c which extends longitudinally forward (parallel to axis 13) and into proximity with plate 6. Rack 17 is shown to characterize one side of a continuous relatively wide groove 20 having a U-shaped course contained at constant laterally inward offset from the U-shaped course of rack 17; the other and further inwardly offset side of groove 20 is relieved to define a rim 25 which is flush with the base 21 of groove 20 (i.e., to an extent at least as deep into the body of slide 5 as is the depth of the teeth of rack 17). Within the groove base 21 is a further-recessed (i.e., deeper) and more narrow groove formation or cam 22 having a smoothly continuous U-shaped course contained at constant laterally inward offset from (i.e., effectively parallel to) the course of rack 17; and the depth of the bottom 23 of cam groove 22 is constant, with respect to the base 21 of the wider groove 20.

A drive pinion 26 meshes with rack 17 and is carried at the lower end of a shaft 27, deriving rotary support on an axis 30 that is fixed with respect to frame member 10. Beneath pinion 26 and mounted to the lower end of shaft 27, a cam roller 31 extends into guided engagement with one or the other of the side walls 24 of cam groove 22, it being noted that said side walls are at all times locally parallel to the pinion/roller axis 30 at cam engagement therewith, and that the diameter of cam rollers 31 corresponds to the cam width between walls 24, less a small running clearance to assure cam engagement with only one wall 24 at any given time.

Fixed support for the rotary axis 30 is shown to be provided by a plate or bracket 39 welded to frame member 10. The cantilevered end of bracket 39 has a cylindrical bore or cut-out 38 about axis 30, and the upper flange of a sleeve 35 is concentrically secured to bracket 39 at 38, by plural spaced bolts 37. Within sleeve 35, and contained between a lower flange and an upper snap ring, is a shaft (27) supporting assembly of two ball bearings 34, with an annular spacer 36 between the outer race rings of bearings 34. The upper end of shaft 27 extends beyond the region of support by bearings 34 and is fitted via key means 33 to a twin V-belt pulley 32a, and the relationship is such that the hub of pulley 32a and the hub of pinion 26 have axially loaded engagement with inner race rings of the respective bearings 34, thus assuring a so-called angular-contact loading of the spaced ball bearings and therefore an absence of radial play in shaft-27 support at each of the ball bearings.

Drive to the V-belt pulley 32, and thus to shaft 27 and its pinion 26, is via two narrow V-belts 41 from another twin V-belt pulley 32b fixed to the drive shaft of a motor 47. Motor 47 will be understood to be mounted to the machine frame, for left/right displaceability within an enclosure wall of stand 10, in a manner not shown in FIG. 1; and an upstanding lug 42 forming part of bracket 39 is shown with adjustment-screw means 44 acting on motor 47, for V-belt tensioning purposes.

To accomplish an intended tool change, a tool that is currently chucked to the machine spindle is replaced by a tool from the tool magazine, which illustratively may be of known drum configuration (not shown) wherein different tools are separately retained in individual quivers. For tool replacement, a particular tool in its own quiver is identified in known manner by control means; and by turning the drum magazine (as by a rotary index thereof) to bring the particular quiver into the tool-change position, the particular replacement tool is poised for removal from its quiver by one of grippers or clamps of the dual-clamp gripper device (not shown) carried by plate 6; in this situation, the axis of the tool (to be replaced) in the spindle, and the axis of the particular replacement tool in its quiver, are both parallel to the axis 13 of slide 5. And it will be understood that, to effect a gripping procedure, both gripper clamps are actuated from open to closed condition, namely, (a) the normally open gripper clamp which is associated with the tool in the spindle (and which remains at all times in axial alignment with the gripping region of said tool, even during a machining operation), and (b) the normally open gripper clamp into which the replacement tool in the quiver has been indexed.

In FIGS. 1 to 3, the actual tool-change procedure commences, by controlled starting of the tool-changer motor 47, once the two gripper clamps have closed for their respective engagements (a) to the spindle-mounted tool to be replaced and (b) to the replacement tool in the indexed quiver. The drive pulley 32b rotates the driven pulley 32a, and thus shaft 27 and its pinion, in the direction to displace slide 5 axially forward (i.e., to the left, in FIG. 1). In the course of this axially forward stroke, the twin grippers (clamps closed) simultaneously pull the tool to be replaced and the replacement tool, out of the spindle and out of the indexed magazine quiver, respectively. Once slide 5 reaches the outermost limit of its forward stroke, which event occurs when pinion 26 engages the first rear elbow bend 18a of the rack, both tools are axially clear of the spindle and of the quiver. Having traversed bend 18a, the continuously driven pinion 26 is operative (via rack web 17b) to rotate slide 5 (and the extracted tools) to the extent of a 180° reversal, and through its engagement with the second elbow bend 18b. This 180° indexing displacement of the tool-laden double gripper brings the replacement tool from the quiver into axial alignment with the front of the machine spindle, while the tool which has been removed from the spindle is brought into axial alignment with the front of the quiver. And when pinion 26 reaches the end of the second bend 18b, all rotary displacement ends, and slide 5 (with its tool-laden double gripper) is retracted axially as pinion 26 progresses along the second rack arm 17b, until slide 5 finally reaches the stop surface of frame member 10. In the course of this retracting displacement, the replacement tool enters the spindle chuck and the replaced tool enters the quiver of the drum magazine.

At this retracted position of slide 5, the control means (not shown) will be understood to actuate both gripper clamps to open position and to turn off the motor 47, so that the spindle can chuck the replacement tool and machining can commence, while the replaced tool in the magazine quiver can be indexed or otherwise returned to a controlled storage position, in readiness for retrieval when next needed.

It will be appreciated that during the entire tool-change procedure, the shaft 27 and pinion 26 will have been guided via roller (31) tracking engagement in cam groove 22. And it will be further appreciated that once the described tool-change procedure has been completed (with its 180° rotary shift of slide 5), the slide 5 will be in its position 180° reversed from that shown in FIG. 1. The control means will therefore be understood to excite motor 47 for drive in the reverse direction, when the time comes for the next change of tools.

In one particularly advantageous embodiment of the tool changer described, the motor 47 can include a gear transmission (to pulley 32b) which converts the uniform rotation of the motor shaft into a non-uniform movement of the V-belt pulley 32b, as for example via an elliptical-gear transmission (not shown). With such a transmission, the transmission ratio can be changed as a function of displacement to so effect a tool change that the axial and rotary movements of slide 5 occur rapidly and the speeds of pinion passage in bends 18a and 18b are slow.

As an alternative to such a non-linear transmission, uniform rotary movement may be converted into a non-uniform rotary movement of pinion 26 by speed and directional control of motor 47.

In another particularly favorable embodiment, the load taken up by the tools to be replaced can be measured by a sensor system carried by bearing member 4. In this arrangement, the sensor system acts on the control system in such manner that, when changing particularly heavy tools, the output speed of rotation of motor 47 is reduced so that the entire tool-change process can be carried out more slowly and thus without overloading the tool changer.

FIGS. 4 to 8 show a modified embodiment in which all those parts which correspond essentially to the parts of the embodiment of FIGS. 1 to 3 are identified by the same reference numbers. Therefore, only those parts of the modified embodiment which differ from the embodiment of FIGS. 1 to 3 will be described. The important difference in this modified embodiment is that, to achieve a precisely defined position of the gripper device and its mounting slide 5, wherein the precise definition is with respect to the tools to be replaced, no axial stop is required for the slide; to require a stop necessarily means that rotary drive of pinion 26 must stop precisely at the instant when the slide reaches the stop, but in the modified embodiment a non-critical time is available in which to terminate the drive of pinion 26, once the retracted position has been achieved.

As can be noted from FIGS. 4 and 5, the parallel longitudinally extending rack arms 17a and 17b of slide 5 are shorter than in the embodiment of FIGS. 1 to 3, in that the forward end of slide 5 is characterized by a cylindrical land or bearing surface 5' upon which an annular member or ring 53 is rotatably fitted, and the outer surface of ring 53 is characterized by short rack arms 54a and 54c which can register with the rack arms 17a and 17b of slide 5; also, the rack arms 54a and 54c are tangentially connected via 90° bends 55a and 55b to the angularly spaced ends of a rack web 54b which, like the rack web 17b, follows its course in a plane normal to the central axis 13. The cylindrical reduction which defines land 5' is to such depth that registration may also exist between the cam groove 22 of slide 5 and a corresponding cam groove 56 in ring 53; thus, when slide 5 is fully retracted namely, when slide 5 is in its final rear position of the tool-change procedure (FIG. 4), the cam roller 31 is fully and only engaged to the cam groove 56 in ring 53, and the rack and cam-groove formations of ring 53 complete a closable/openable loop rack ring for continuous pinion 26 guidance and engagement.

To maintain orientational control of the tool-changing plate 6 while cam roller 31 and pinion 26 are no longer engaged to the cam groove 22 and rack 17 of slide 5, a disengageable locking mechanism assures that plate 6 will be temporarily keyed against rotation with respect to bearing member 4. To this end, FIGS. 4 and 5 show such a lock to comprise a cylindrical pin 51 bolted to plate 6 and arranged coaxial to the central axis 13 of base member 5; pin 51 is characterized by one or more longitudinal keying splines or ridges 52 which are engageable with corresponding key grooves 50 in the cylindrical bearing-member bore 4' in which pin 51 is axially slidable. Upon axial displacement of slide 5 from its forward position to the retracted position of FIG. 4, and before emergence of roller 31 from the cam groove 22, the pin 51 establishes a keyed relation (at 52–50) with the bore 4', so that the dual-gripper plate 6 and thus slide 5 are anti-rotationally locked to the bearing member 4 by the indicated keyed engagement.

When cam roller 31 is engaged to cam groove 22 of slide 5, ring 53 could be free to rotate on land 5' and thus with respect to slide 5. However, to avoid such rotation, a detent in the form of a spring-loaded ball 57 engages a local axial slot in the reduced end of slide 5. The detent engagement will be understood to releasably retain the condition in which racks 17/54 and cam grooves 22/56 are in the described relation of aligned registration.

In FIG. 4, an annular drive member 59 carried by ring 53 will be understood to provide means for utilizing relative rotation of ring 53 with respect to slide 5 for actuating the dual grippers (not shown) which are mounted to the exposed face of plate 6; such an actuating connection is not shown but may include detent-retained positions to identify the respective open and closed conditions of the grippers and the actuating connection may also include cam means operative to open/close the gripper clamps, whatever the direction of such relative rotation.

The embodiment of FIGS. 4 to 6 operates essentially as described for the first embodiment. The difference is that, having completed a tool change, i.e., with slide 5 fully retracted, pinion 26 is in mesh with rack web 54b; ring 53 has therefore been rotated so as to angularly offset its rack arms 54a/54c away from alignment with the rack arms 17a/17c of slide 5, and the angular displacement to achieve this angular offset has been used (via actuating ring 59, reacting against the angularly locked condition of plate 6) to actuate the dual grippers to their open condition. FIG. 7 is a simplified display of the angular relation between ring 53 and slide 5 when pinion drive in one direction comes to a halt, with slide 5 fully retracted (via a rack course 17a/54a to the central region of web 54b) and with angular displacement $\Delta_1$ having been utilized to accomplish an opening actuation of the gripper clamps; and FIG. 8 is a similar display of the corresponding angular relation of ring 53 and slide 5 when pinion drive in the opposite direction comes to a halt, with slide 5 again fully retracted (but via course 17c/54c to the central region of web 54b) and with angular displacement $\Delta_2$ having been utilized to accomplish an opening of the gripper clamps.

It should be noted that in the FIGS. 4 to 6 embodiment, no stop is needed for location of the retracted position of slide 5, since the axial position of slide 5 (and thus of the dual grippers) is determined by ring 53, via roller 31 location in the arcuate web portion of cam groove 56, at which point the grippers will have been actuated to open condition. In reaching this retracted condition, the arcuate rack bends at 55a/55b will be understood to have promoted a gentle deceleration (soft braking) near the end of the slide-retraction stroke.

In the ensuing tool-change cycle, pinion 26 is rotated in the direction opposite that of its previous cycle, so that ring 53 is angularly displaced until pinion 26 (via one of the rack bends 55a/55b) restores ring 53 to its base position of aligning the rack arms 54a/54c with the rack arms 17a/17c of slide 5. In the course of this angular displacement, the grippers are actuated to closed position, i.e., into gripped engagement with the tool to be replaced and with the replacement tool. With continuing pinion 26 rotation, slide 5 is moved axially forward, and the change of tools proceeds as described for the first embodiment, except of course that at the end of the retraction stroke of slide 5, pinion 26 is again in mesh with rack web 54b, and ring 53 has been partially rotated to re-open the grippers. Since the direction of pinion rotation is reversed for each succession tool-change cycle, the control which couples actuating member 59 to the grippers will always effect a reversal of the action of drive member 59 upon the grippers, so that the grippers are always first closed at the start of a tool-change cycle and are always opened at the end of the tool-change cycle, it being understood that suitable cam means and position-retaining detent means (not shown) are in the coupling of actuating member 50 to the respective grippers, so that either direction of ring 53 vs. slide 5 rotation is operative to actuate the gripper clamps.

It is thus merely necessary for ring 53 to undergo minimum rotary displacement to actuate the grippers. At the same time, this minimum rotary displacement is well accommodated by the time that roller 31 enters the arcuate-web portion of cam groove 56, so that there is no critical requirement that the pinion-drive motor 47 need be stopped at a precisely fixed angular position of ring 53.

What is claimed is:

1. In a tool-changer mechanism for a machine tool, such as a drilling, boring or milling machine, wherein for a single tool-changing cycle a slide for carrying a tool-gripping device first is guided for axial displacement (a) from a retracted rear position of gripping engagement with an installed used tool to be replaced and with a stored tool that is to replace the used tool and (b) to a forward position into which a gripped installed used tool and a gripped replacement tool have been displaced in extraction from their respective installed and stored locations, said slide being then partially rotated in the forward position to index the gripped replacement tool into alignment for prospective installation while also indexing the gripped used tool into an alignment for prospective storage, all prior to axial withdrawal of the slide to its retracted position, the improvement (c) in which a single continuous rack externally accessible on said slide follows a generally U-shaped course comprising two parallel axial legs and an arcuate leg connecting corresponding forward ends of the axial legs, and (d) in which a single drive pinion meshes with said rack, so that a single continuous drive of said pinion in a first rotational direction may impart a single cycle of axial and rotary slide displacement from one to the other end of said U-shaped course, and so that a succeeding single continuous drive of said pinion in the opposite rotational direction may impart another single cycle of axial and rotational displacement from said other end to said one end of said U-shaped course.

2. Gear mechanism for coupling a fixed-axis bi-directional pinion drive to a cylindrical tool-change slide which is journalled for axial and rotary displacement along and about a slide axis normal to the fixed axis of said pinion drive, comprising a generally U-shaped rack externally exposed on said slide and in continuous mesh with said pinion; said rack having, at a single radius of offset from the slide axis, first and second circumferentially spaced parallel straight arms, an arcuate web between said arms at one longitudinal end of said arms, and elbow bends connecting the respective web ends to corresponding adjacent ends of said arms.

3. Gear mechanism according to claim 2, in which a follower roll is mounted adjacent said pinion and with freedom to rotate on said pinion-drive axis, said slide having a cam groove at uniform offset from said rack throughout the U-shaped course thereof, and said follower roll being engaged in and tracking said cam groove, whereby pinion-rack engagement is continuously maintained through a single pinion-driven cycle, beginning at an end position on one arm, and proceeding thence along said one arm and, via said elbows and web along and to the end of the other arm.

4. In a machine tool wherein a tool-spindle axis is spaced from and parallel to an axis of stored replacement-tool orientation and availability, tool-changing mechanism including a cylindrical tool-changer slide deriving fixed-bearing support from the machine tool, said slide being displaceable axially along and rotatable about its axis, with the fixed-bearing support retaining the slide axis parallel to and midway between said spindle axis and said stored-tool-availability axis, and gear-driven means for imparting to said slide a cycle of axial displacement from an axially retracted position to a forward position, followed by rotational indexing of 180°, and concluding with axial displacement to said axially retracted position; said gear-driven means comprising a drive pinion on a machine-fixed axis of rotation that is normal to the slide axis, and a generally U-shaped rack in mesh with said pinion and carried by said slide, said rack having circumferentially spaced parallel arms which have pinion engagement between said retracted and forward positions, and said rack having an arcuate web connecting said arms at the forward position and engaged to said pinion during rotational indexing of said slide.

5. A tool changer for a machine tool wherein a plurality of tools are held individually in a tools magazine to one side of a tool spindle for selective interchange of tools between spindle and magazine by extraction from the spindle and insertion into the magazine concurrently with extraction from the magazine and insertion in the spindle, said tool changer comprising in combination a longitudinal support member having a first longitudinal axis and first and second ends, said first end being joined to and supported by a structural member of the machine tool, a longitudinal bearing member having opposite ends and a second longitudinal axis, said bearing member being co-axially coupled to said support member for both axial and rotary movement relative to said first longitudinal axis, said bearing member being axially moveable between a first position defined by a stop means where one end of said bearing member is adjacent said first end of said support member and a second position where said one end of said bearing member is spaced from said first end of said support member a distance in excess of that required to fully extract respective tools from both said tool spindle and said tools magazine, said bearing member being rotatable about said longitudinal axes through an arc of at least 180°, mounting means joined to said end of said bearing member that is said one end, said mounting means having an exposed face for mounting first and second tool gripping devices diametrically equidistant from said longitudinal axes; U-shaped gear toothed means carried by said bearing member, said gear toothed means having two linear toothed arms, a circular toothed section having opposite ends, and curved toothed transition sections, said transition sections respectively interconnecting each end of said circular section with an end of a respective linear arm, said gear toothed means being disposed relative to said longitudinal axes with said linear arms parallel to said axes and with said circular section centered on said axes adjacent said one end of said bearing member, the length of said linear arms being at least as great as said distance, and said circular section extending over an arc of 180°; a pinion rotatably mounted on a structural member of said machine tool in meshing engagement with said part toothed means; bi-directional drive means drivingly coupled to said pinion; and means coupled to said gear toothed means for maintaining said gear toothed means and said pinion in meshing engagement.

6. A tool changer according to claim 5, wherein means are provided coupled to said bearing member for locking said bearing member against rotation whenever said bearing member occupies said first position; a second U-shaped gear toothed means carried by and rotatable relative to said bearing member, said second gear toothed means having at least a second circular toothed section having oppostite ends to which are joined respective curved toothed transition sections, and additional means coupled to said second means and said pinion in meshing engagement, said second gear toothed means being disposed relative to said longitudinal axes with said second circular toothed section centered on said axes spaced from said one end of said bearing member and with said transition sections alignable with said toothed arms of said first gear toothed means for a given rotatable position of said second gear toothed means to establish a closed gear loop, whereby said additional means provides said stop means for defining said first position of said bearing means when said pinion engages said second circular toothed section and rotates said second bar toothed means out of alignment with said toothed arms of said first gear toothed means.

7. A tool changer according to claim 6, wherein said means for locking said bearing member against rotation comprises a tongue-and-groove mechanism coupled between said bearing member and said support member.

8. A tool changer according to claim 6, wherein a detent mechanism is disposed in cooperative relation to said second U-shaped gear toothed means for resisting rotation of said second U-shaped gear toothed means relative to said bearing member when said pinion engages one of said toothed arms of said first gear toothed means.

9. A tool changer according to claim 5, wherein said means for maintaining said gear toothed means and said pinion in meshing engagement comprises a guide on said bearing member for engaging means coupled to said pinion.

10. A tool changer according to claim 5, wherein said bearing member is in the form of a cylinder and said U-shaped gear toothed means is developed on one side wall of a U-shaped groove that extends longitudinally along an element on the radially outer surface of the cylinder from said opposite end toward said one end of said bearing member, circumferentially 180° around said cylinder and then back longitudinally along an element of said cylinder to said opposite end.

11. A tool changer according to claim 5, wherein a cam follower is joined to said pinion, and a cam groove is formed in said bearing member for engaging said cam follower, said cam groove paralleling said U-shaped gear toothed means.

12. A tool changer according to claim 11, wherein said cam follower comprises a roller mounted co-axially adjacent said pinion.

* * * * *